(12) United States Patent
Cheng et al.

(10) Patent No.: US 12,093,232 B2
(45) Date of Patent: Sep. 17, 2024

(54) METHOD FOR STORING TIME SERIES DATA

(71) Applicant: TAOS DATA, Beijing (CN)

(72) Inventors: Hongze Cheng, Beijing (CN); Haojun Liao, Beijing (CN); Jianhui Tao, Beijing (CN)

(73) Assignee: TAOS DATA, Chaoyang District Beijing (CN)

( * ) Notice: Subject to any disclaimer, the term of this patent is extended or adjusted under 35 U.S.C. 154(b) by 0 days.

(21) Appl. No.: 18/027,716

(22) PCT Filed: Dec. 17, 2020

(86) PCT No.: PCT/CN2020/137378
§ 371 (c)(1),
(2) Date: Mar. 22, 2023

(87) PCT Pub. No.: WO2022/126551
PCT Pub. Date: Jun. 23, 2022

(65) Prior Publication Data
US 2023/0385254 A1    Nov. 30, 2023

(51) Int. Cl.
*G06F 16/22* (2019.01)
*G06F 16/2458* (2019.01)

(52) U.S. Cl.
CPC .......... *G06F 16/22* (2019.01); *G06F 16/2474* (2019.01)

(58) Field of Classification Search
CPC ............................. G06F 16/22; G06F 16/2474
See application file for complete search history.

(56) References Cited

U.S. PATENT DOCUMENTS

| | | | |
|---|---|---|---|
| 2020/0050614 A1* | 2/2020 | DeLand | G06F 16/285 |
| 2020/0372071 A1 | 11/2020 | Alayli | |
| 2021/0349898 A1* | 11/2021 | Schuerings | G06F 16/182 |

FOREIGN PATENT DOCUMENTS

| | | |
|---|---|---|
| CN | 104077405 A | 10/2014 |
| CN | 108182244 A | 6/2018 |
| CN | 108563711 A | 9/2018 |
| CN | 112181973 A | 7/2019 |

* cited by examiner

*Primary Examiner* — Cam Y T Truong
(74) *Attorney, Agent, or Firm* — Greer, Burns & Crain, Ltd.

(57) ABSTRACT

A method for storing time series data is provided, the method includes: caching time series data containing at least one record to a memory in a row-based storage manner; when the time series data needs to be written to a disk, determining a sum of number of records according to the to-be-written-to-disk time series data and time series data in a LAST file of the disk; if the sum is less than a pre-set number N, writing the to-be-written-to-disk time series data to the LAST file of the disk; if the sum is greater than or equal to the pre-set number N, merging the to-be-written-to-disk time series data and the time series data in the LAST file of the disk, and writing merged time series data to a DATA file for permanently saving data of the disk in a column-based storage manner.

9 Claims, 4 Drawing Sheets

--- caching time series data containing at least one record from a network to a memory in a row-based storage manner — S101 determining whether the time series data cached in the memory needs to be written to the disk, and when the time series data cached in the memory needs to be written to a disk, determining a sum of number of records according to number of records of the to-be-written-to-disk time series data and number of records of the time series data in a LAST file of the disk — S102 if the sum of number of the records is less than a pre-set number N, writing the to-be-written-to-disk time series data to the LAST file of the disk; if the sum of number of the records is greater than or equal to the pre-set number N, merging the to-be-written-to-disk time series data and the time series data in the LAST file of the disk to obtain a merged time series data, and writing the merged time series data to a DATA file for permanently saving data of the disk in a column-based storage manner — S103

METHOD FOR STORING TIME SERIES DATA

CROSS-REFERENCE TO RELATED APPLICATIONS

This application is the U.S. National Stage Application of PCT/CN2020/137378 filed Dec. 17, 2020, the entire disclosure of the application is herein incorporated by reference.

TECHNICAL FIELD

The present invention relates to the field of data processing, in particularly to a method for storing time series data.

BACKGROUND

To improve the compression ratio and rate of analysis, time series data is generally stored in a column-based storage manner. The column-based storage requires that the time series data be stored in segments corresponding to time periods. When a segment is created, it is generally necessary to reserve a piece of storage space. If there are enormous timelines (a timeline is a time period corresponding to the time series data collected by one data collection point), such as 10 million timelines, the space that needs to be reserved is very large, resulting in a shortage of system storage resources, especially memory resources.

SUMMARY

Embodiments of the present invention provide a method for storing time series data, which solves the problem of insufficient storage resources caused by reserving a large amount space for time series data records when storing time series data records in a column-based storage manner.

An embodiment of the present invention provides a method for storing time series data, the method including: caching time series data containing at least one record from a network to a memory in a row-based storage manner; determining whether the time series data cached in the memory needs to be written to the disk, and when the time series data cached in the memory needs to be written to a disk, determining a sum of number of records according to number of records of the to-be-written-to-disk time series data and number of records of the time series data in a LAST file of the disk; if the sum of number of the records is less than a pre-set number N, writing the to-be-written-to-disk time series data to the LAST file of the disk; if the sum of number of the records is greater than or equal to the pre-set number N, merging the to-be-written-to-disk time series data and the time series data in the LAST file of the disk to obtain a merged time series data, and writing the merged time series data to a DATA file for permanently saving data of the disk in a column-based storage manner.

Preferably, determining whether the time series data cached in the memory needs to be written to the disk comprises: checking the memory or an offset list of the time series data in the memory; if the memory is insufficient or the offset list of the time series data in the memory is full, determining that the time series data cached in the memory needs to be written to the disk.

Preferably, the LAST file has a storage space for storing N records of the time series data.

Preferably, writing the to-be-written-to-disk time series data to the LAST file of the disk comprises: writing the to-be-written-to-disk time series data after the time series data in the storage space of the LAST file.

Preferably, the LAST file contains an offset list of the time series data, and the offset list contains N offset records for indicating offsets of the records of the time series data in the LAST file.

Preferably, after writing the to-be-written-to-disk time series data to the LAST file of the disk, writing the offsets of corresponding records of the to-be-written-to-disk time series data sequentially to the offset list of the time series data.

Preferably, the LAST file contains the time series data already written thereto.

Preferably, writing the to-be-written-to-disk time series data to the LAST file of the disk comprises: merging the to-be-written-to-disk time series data and the time series data in the LAST file of the disk to obtain a merged time series data; creating a new LAST file for storing the merged time series data; writing the merged time series data to the new LAST file, and then deleting the original LAST file.

Preferably, merging the to-be-written-to-disk time series data and the time series data in the LAST file of the disk to obtain a merged time series data, and writing the merged time series data to a DATA file for permanently saving data of the disk in a column-based storage manner comprises: reading the time series data from the LAST file; merging the to-be-written-to-disk time series data and the time series data read from the LAST file to obtain the merged time series data; and writing the merged time series data to the DATA file of the disk in the column-based storage manner.

Preferably, the LAST file and the DATA file are both files in the disk for storing the time series data.

The technical solution provided by the embodiments of the present invention have the following beneficial effects: as described in the embodiments of the present invention, when the records of the time series data in the memory are written to the disk, if the total number of the records of the time series data in the memory and the records of the time series data in the LAST file is greater than the pre-set number N, the records are merged and then stored in the column-based storage manner; in this way, it is no need to reserve a large amount of storage resources, which solves the problem of insufficient storage resources caused by reserving a large amount of space for the records of time series data when they are stored in the column-based storage manner.

DETAILED DESCRIPTION

The preferred embodiments of the present invention will be described in detail below with reference to the accompanying drawings. It should be understood that the preferred embodiments described below are only used to illustrate and explain the present invention, but not to limit the present invention.

Figure 1:
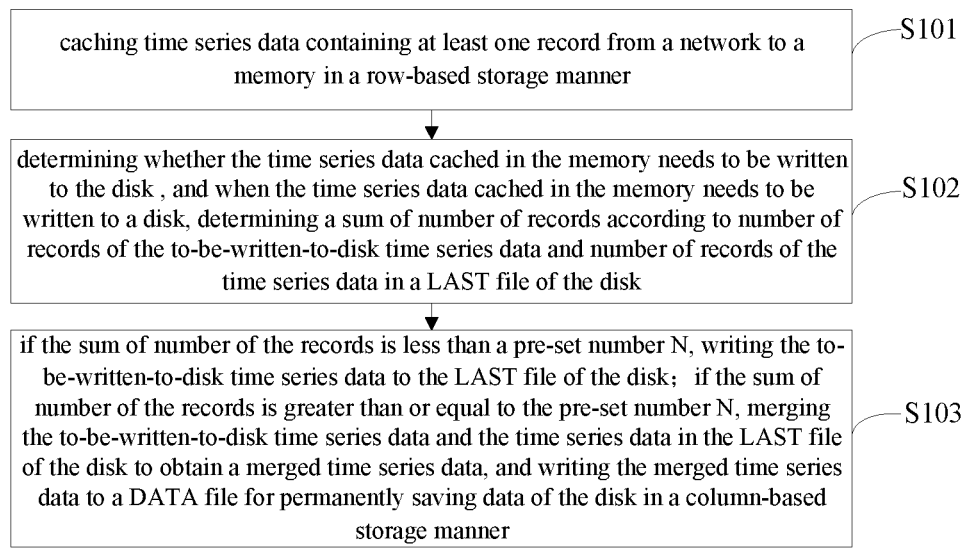
FIG. 1 is a schematic flowchart of a method for storing time series data according to an embodiment of the present invention.

FIG. 1 is a schematic flowchart of a method for storing time series data according to an embodiment of the present invention, and as shown in FIG. 1, the method includes:

step S101, caching time series data containing at least one record from a network to a memory in a row-based storage manner;

step S102, determining whether the time series data cached in the memory needs to be written to the disk, and when the time series data cached in the memory needs to be written to a disk, taking the time series data that needs to be written to the disk as to-be-written-to-disk time series data, and determining a sum of the number of records according to the number of records of the to-be-written-to-disk time series data and the number of records of the time series data in a LAST file of the disk;

step S103, if the sum of the number of the records is less than a pre-set number N, writing the records of the to-be-written-to-disk time series data to the LAST file of the disk; if the sum of the number of the records is greater than or equal to the pre-set number N, merging the records of the to-be-written-to-disk time series data and the records of the time series data in the LAST file of the disk to obtain records of the merged time series data, and writing the records of the merged time series data to a DATA file for permanently saving data of the disk in a column-based storage manner.

The time series data is recorded in chronological order. The time series data of each timeline is collected by one data collection point, including at least one record. And each record includes data of various parameters.

The disk (i.e., a persistent storage medium) of the embodiments of the present invention contains two files for saving data being written to the disk. One is a file for storing the records of the time series data in the column-based storage manner, denoted as a DATA file for clarity, where the number of the records of the time series data in each data block of the DATA file is greater than or equal to N. It should be noted that other file names than "DATA file" may also be used, and the choice of the file name is not intended to limit the present invention. The other is a file for storing the latest records of the time series data, denoted as a LAST file, where the number of the records of the time series data in the LAST file is less than N. It should be noted that other file names than "LAST file" may also be used, and the choice of the file name is not intended to limit the present invention. In other words, the LAST file and the DATA file are files in the disk for storing the records of the time series data.

Herein, in the row-based storage manner, all the records of the time series data are recorded in chronological order (one record of the time series data includes data of multiple parameters), that is, the records of the time series data are stored one after another. In the column-based storage manner, the data of each parameter is recorded in chronological order, that is, the data of each parameter in the record is stored one after another.

In an embodiment, when a record in the memory is written to a disk, a sum of the number of the records of the time series data in the memory and the number of the records of the time series data in the LAST file may be calculated to determine a corresponding execution scheme. The details are described below.

In the above step S102 includes: checking the memory or an offset list of the time series data in the memory; if the memory is insufficient or the offset list of the time series data in the memory is full, determining that the time series data cached in the memory needs to be written to the disk. Taking the time series data that needs to be written to the disk as the to-be-written-to-disk time series data. At this time, the LAST file is checked to determine the number of the records of the time series data already stored in the LAST file, and then the number of the records of the time series data already stored in the LAST file is added to the number of the records of the to-be-written-to-disk time series data cached in the memory to obtain the sum of the number of the records of the time series data (or the total number of the records).

Herein, the offset list of the time series data cached in the memory includes a plurality of offset records for indicating offsets of the records of the time series data cached in the memory.

In the above step S103, the pre-set number N is the minimum number of records required for the column-based storage, that is, only when there are at least N records of the time series data of one timeline, it is allowable to write the at least N records to the DATA file.

In the above step S103, the storage format of the LAST file can be various, and three types are proposed herein; correspondingly, there are three modes of writing the records of the to-be-written-to-disk time series data to the LAST file of the disk, which are described below respectively.

Mode 1: LAST File with Reserved Space

In this mode, the LAST file has storage space for storing N records of the time series data. That is, storage space for storing N records is reserved for the time series data. In this way, if the total number of the records of the time series data is less than the pre-set number N, it falls short of the minimum number of records required for the column-based storage; at this time, the records of the to-be-written-to-disk time series data are directly written after all the records of the time series data in the storage space, that is, appended after all the records of the time series data in the storage space.

For the records of time series data of a single timeline, the appending operation is simple, with few times of disk IO, speedy in reading and writing data; however, consumption of a small amount of storage space (i.e., the storage space for N records) is necessary.

Although it is necessary to reserve storage space for a few records of the time series data, i.e., N records, a great volume of storage space is saved in comparison with the storage space reserved in the prior art.

Mode 2: LAST File without Reserved Space (I)

In this mode, the LAST file contains an offset list of the time series data, and the offset list contains N offset records for indicating offsets of the records of the time series data in the LAST file.

If the total number of the records of the time series data is less than the pre-set number N, it falls short of the minimum number of records required for the column-based storage; at this time, the records of the to-be-written-to-disk time series data (i.e., data to be stored) are written to the LAST file, and then offsets of corresponding records of the to-be-written-to-disk time series data are sequentially written to the offset list of the time series data, that is, appended to the offset list of the time series data.

For the records of time series data of a single timeline, only the storage space for the offset list needs to be configured in the LAST file, without reserving the storage space for the N records of the time series data, thus saving a great volume of storage space.

Mode 3: LAST File without Reserved Space (II)

In this mode, the LAST file contains the records of the time series data already written thereto.

If the total number of the records of the time series data is less than the pre-set number N, it falls short of the minimum number of records required for the column-based storage; at this time, the records of the to-be-written-to-disk time series data and the records of the time series data in the LAST file of the disk are merged to obtain merged records of the time series data; a new LAST file for storing the merged records of the time series data is created; the merged records of the time series data are written to the new LAST file, and then the original LAST file is deleted.

In this mode, the time series data records in the LAST file may be stored in the row-based storage manner to increase the rate of writing data, or in the column-based storage manner to increase the rate of analysis.

In this embodiment, it is not necessary to configure the storage space for the offset list in the LAST file or reserve the storage space for the N records, thus saving a lot of storage space.

In the above step S103, merging the records of the to-be-written-to-disk time series data and the records of the time series data in the LAST file of the disk to obtain records of the merged time series data, and writing the records of the merged time series data to the DATA file for permanently saving data of the disk in the column-based storage manner includes: reading the records of the time series data from the LAST file, merging the records of the to-be-written-to-disk time series data and the records of the time series data read from the LAST file to obtain the records of the merged time series data, and then writing the records of the merged time series data to the DATA file in the column-based storage manner.

For one timeline, when the records of the time series data cached in the memory are written to the disk for the first time (i.e., being stored), the number of the records of the time series data in the LAST file is 0; therefore, if the number of the records of the to-be-written-to-disk time series data is greater than or equal to the pre-set number N, then the records of the to-be-written-to-disk time series data are directly written to the DATA file in the column-based storage manner; if the number of the records of the to-be-written-to-disk time series data is less than the pre-set number N, then the records of the to-be-written-to-disk time series data are written to the storage space in the LAST file. When the records of the time series data cached in the memory are written to the disk again, the number of the records of the to-be-written-to-disk time series data is added to the number of the records of the time series data in the LAST file; if the sum is greater than or equal to the pre-set number N, the records are merged and then written to the DATA file in the column-based storage manner; otherwise, the records of the to-be-written-to-disk time series data are appended to the LAST file.

Herein, the row-based storage is combined with the column-based storage, wherein the latest data on one timeline is stored in the row-based storage manner, and only when the number of the records of one timeline in the row-based storage reaches a pre-set number (N), the column-based storage is adopted for the records of the timeline. The normal row-based storage is to store records one by one. By recording the offset of each record on the storage medium in the index table, no space can be reserved, which greatly reduces the demand for storage resources. When the data in the memory is written to a persistent storage medium, the number of the records may be less than N and the records need to be saved in a special file called LAST. When the data in the memory is written to the persistent storage medium again, it is necessary to merge the records in the memory with the records in the LAST file, and then determine whether the merged records need to be written to the column-based storage or remain in the LAST file. In short, the data written to the disk is stored in two files, namely, the DATA file and the LAST file; in the DATA file, the data is stored in the column-based storage manner, and the number of the records in each data block is greater than or equal to the pre-set number N; in the LAST file is used for storing the latest time series data, but the number of the records is less than the pre-set number N. Such a design ensures the rate of data compression and analysis and releases any reserved storage resources.

In the following, the embodiments of the present invention are described in detail from three aspects, that is, memory processing, persistent storage, and LAST file processing. For the convenience of description, the timeline described below is a continuous time period in some scenarios, and time series data in a continuous time range in other scenarios.

I. Memory Processing

A system can pre-allocate a volume of storage space for storing the inserted records, and the storage space is shared by all timelines. The storage space of the memory is managed according to the first-in-first-out loop buffer. The offsets mentioned below are described with respect to this storage space.

Figure 2:
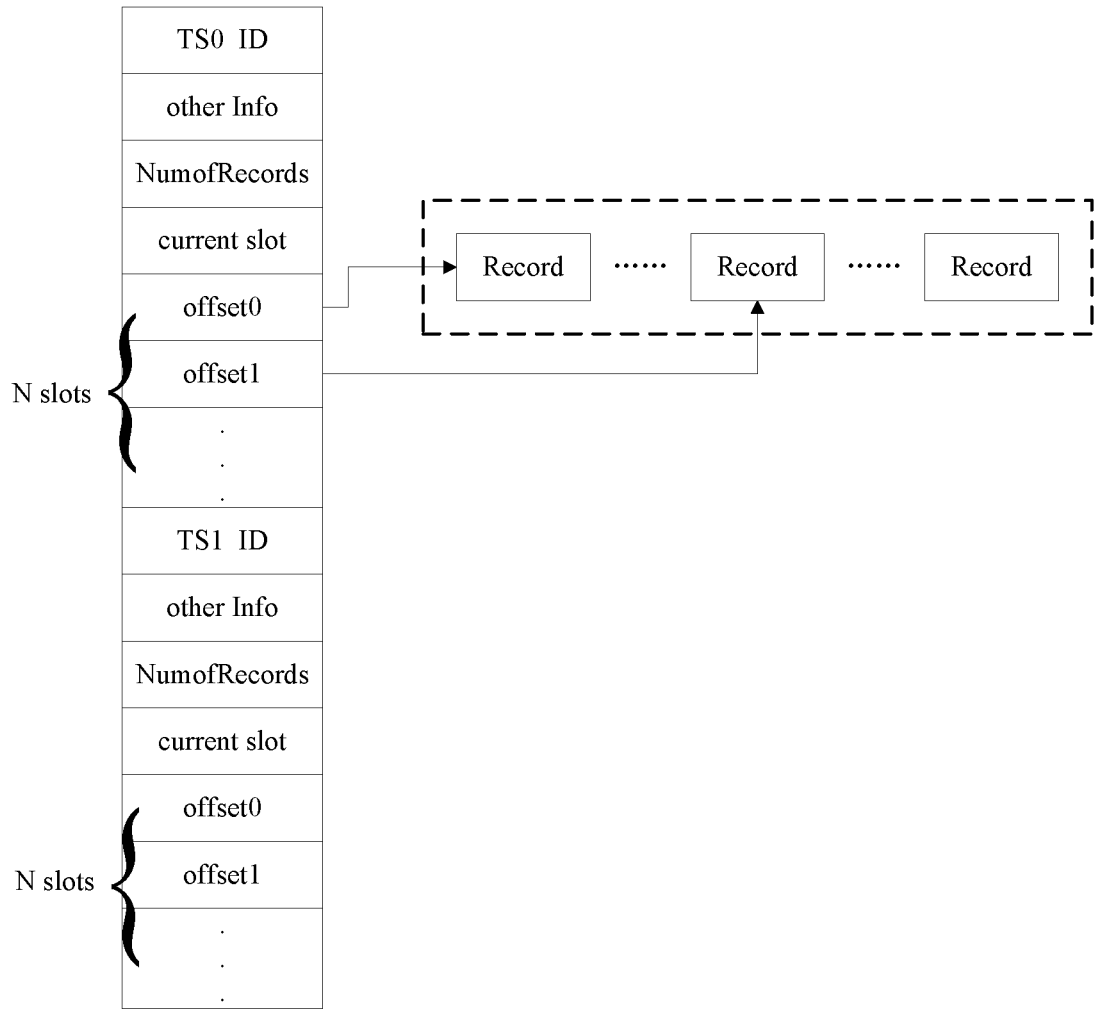
FIG. 2 is a schematic diagram of a storage structure in a memory provided by an embodiment of the present invention.

The storage structure in the memory is shown in FIG. 2. Each timeline has a fixed structure, which is identified by an ID of the timeline, such as TS0 ID and TS1 ID.

numOfRecords: the number of records in the memory.

Current Slot: the location of the last record in the offset list. With numOfRecords and current Slot, the location of the first record of the timeline in the memory can be derived.

offset0, offset1, . . . , offsetN: an offset list. Each timeline has an offset list of a fixed size, recording the offset of each record in the memory. The list is a loop buffer because the record remains in memory after being written to the persistent storage medium until overwritten by a new record.

When a new record is inserted, it is necessary to:
1. allocate space from cache area of the memory, write the new record to the space, and record the offset;
2. calculate a current slot according to the equation: current slot=(current slot+1) % number of Slots; and
3. add 1 to numofrecords.

When allocating the space, if old records need to be overwritten, do the following to the overwritten records:
1. subtract 1 from numofrecords.

II. Persistent Storage

The latest data typically remains in the memory, and the row-based storage is adopted in the memory. The memory manages the time series data according to a first-in-first-out principle, and when the memory is in shortage or the offset list of a certain timeline is full, it is necessary to start a writing-to-disk process and write old data to the persistent storage medium.

For a timeline, the records stored in the memory may not be as many as the minimum number of records required for the column-based storage, so in the persistent storage medium, in addition to the files for column-based storage, a special LAST file needs to be maintained to store these records. If these records are written directly to the column-based storage files, many data blocks contain too few data records, resulting in reduced efficiency in compression and query.

This LAST file needs to be checked every time the system writes a record in memory to the persistent storage medium. For a specified timeline, the number of records in the timeline in the LAST file is checked, and the number of the records in memory is added to the number of the records in the LAST file to obtain a sum, which is then followed by the following steps of determination and operation:

1. if the sum of the number of the records exceeds the minimum number of records required for the column-based storage, all the records in the LAST file are read and merged with the records in the memory, and the merged records are written to the column-based storage.
2. If the sum of the number of the records is less than the minimum number of records required for the column storage, the records in the memory are written to the LAST file.

III. LAST File Processing

The storage format of the LAST file can be various, and three modes are proposed herein, one of which is a mode with reserved storage space and the other two are modes without reserved storage space.

III-1. With Reserved Storage Space

Each timeline has reserved storage space, the size of which is the minimum number of records required for column-based storage N multiplied by the size of a record.

Figure 3:
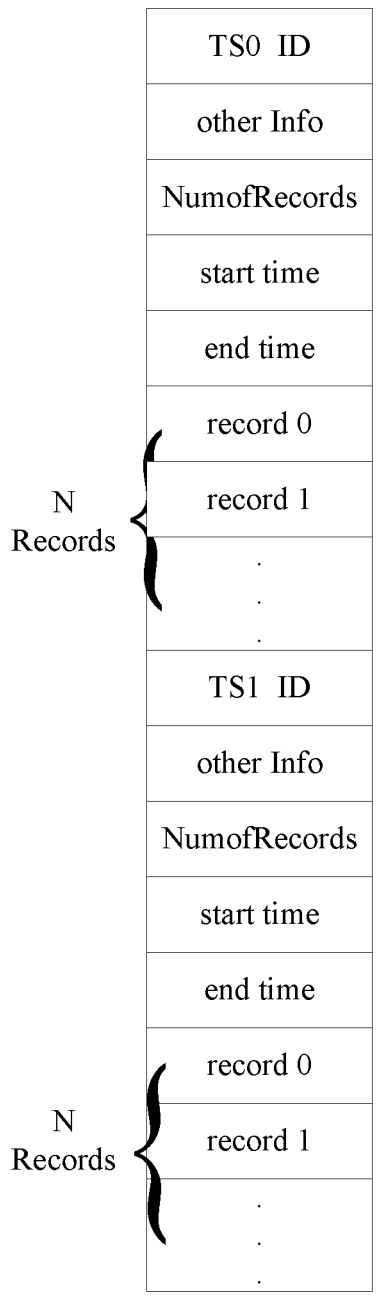
FIG. 3 is a schematic diagram of a LAST file in a mode with reserved storage space provided by an embodiment of the present invention.

FIG. 3 is a schematic diagram of a LAST file using the mode with reserved storage space provided by an embodiment of the present invention. As shown in FIG. 3, each timeline has a fixed structure and is identified by an ID of the timeline, such as TS0 ID and TS1 ID.

numOfRecords: the number of the records in the memory;
start Time, end Time: starting and ending time of the timeline in the memory;
Record0, record1, . . . , RecordN: space required for the total N records, each record has a fixed size. This facilitates query.

The advantage of this mode is that the record merging process is simple. For the data of a single timeline, the merging process is a simple data appending operation, with few times of disk IO, and speedy in reading and writing data; however, more storage space is consumed.

III-2. Without Reserved Storage Space

When writing the data in the memory to the persistent storage medium, the mode without reserved storage space includes two ways of processing.

(I) For one timeline, firstly, the stored records are read from the LAST file and then merged with the records in the memory; if the number of the merged records is greater than N, the merged records are written to the column-based storage file; if the number of records is less than N, the merged records are written to a new LAST file. After all the timelines are processed, the old LAST file is deleted, and only the new LAST file remains. This new LAST file may adopt the column-based or row-based storage. In the column-based storage, analysis is faster and writing is slowed down, and the situation is to the contrary in the row-based storage.

In this way, the Last file needs to be rewritten every time the data in the memory is stored to the persistent storage medium, which is inefficient. To improve the efficiency, the following way is an alternative.

Figure 4:
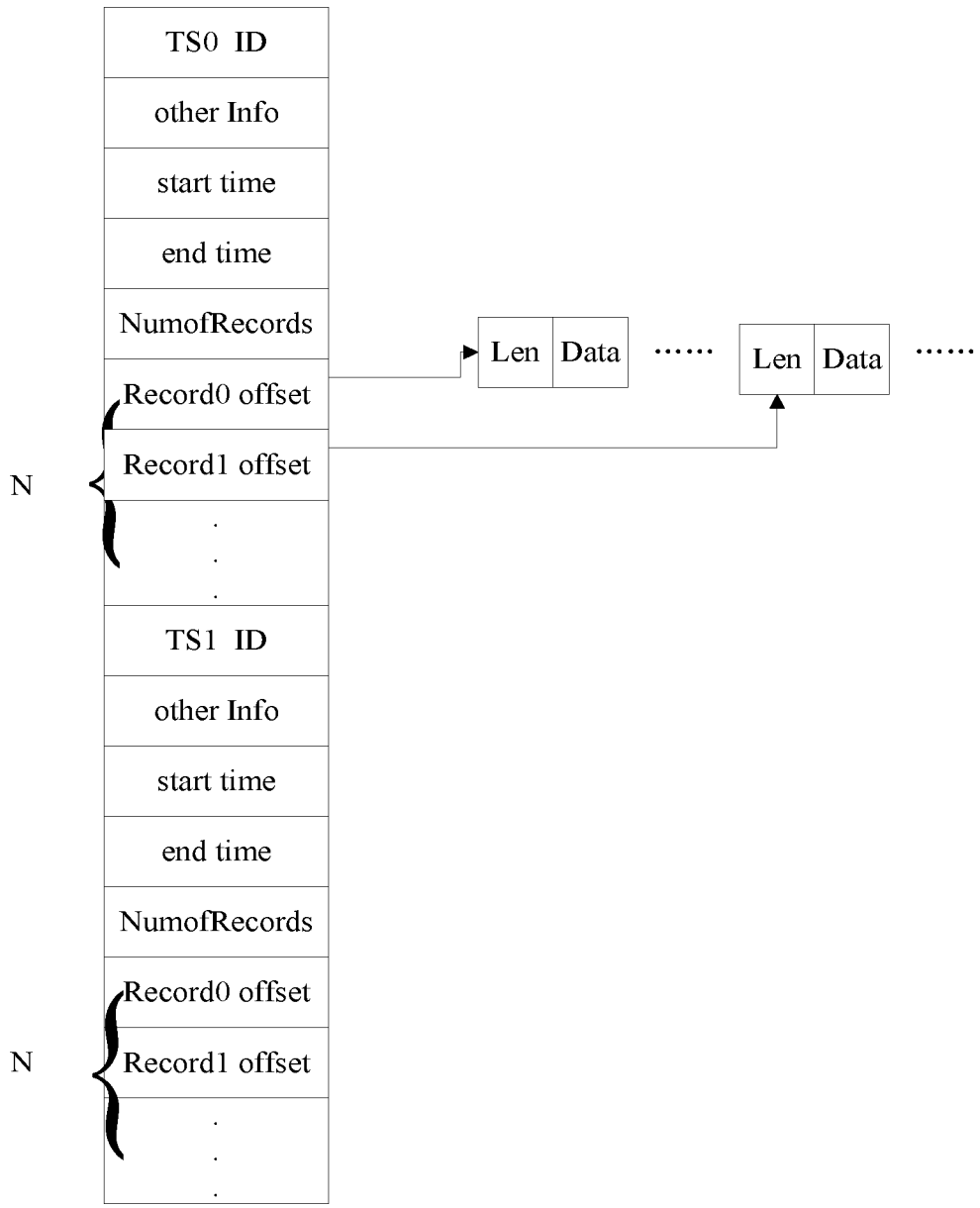
FIG. 4 is a schematic diagram of a LAST file in a mode without reserved storage space provided by an embodiment of the present invention.

(II) For each timeline, a data structure as shown in FIG. 4 is maintained, each timeline having a fixed structure, identified by an ID of the timeline, such as TS0 ID and TS1 ID.

numOfRecords: the number of the records in the memory.
start Time, end Time: starting and ending time of the timeline in the memory;
offset0, offset1, . . . , offsetN: offsets, i.e., the offsets of all the records in the storage.

In this way, the LAST file does not need to be rewritten. It is mainly an appending operation when adding records, which is thus efficient; however, when the number of records in a certain timeline exceeds N, a void will be left in the LAST file after the records are written to the column-based storage file, and in a specific implementation, it needs to be regularly processed to avoid wasting storage space.

Although the present invention has been described in detail above, the present invention is not limited thereto, and various modifications can be made by those skilled in the art in accordance with the principles of the present invention. Therefore, all modifications made in accordance with the principles of the present invention should be understood as falling within the protection scope of the present invention.

The invention claimed is:

1. A method for storing time series data, comprising:
caching, by a processor, the time series data containing at least one record from a network to a memory in a row-based storage manner;
determining, by the processor, whether the time series data cached in the memory needs to be written to the disk, and when the time series data cached in the memory needs to be written to a disk, determining a sum of number of records according to number of records of to-be-written-to-disk time series data and number of records of the time series data in a LAST file of the disk, wherein the determining whether the time series data cached in the memory needs to be written to the disk comprises: checking the memory and an offset list of the time series data in the memory to determine if the memory is insufficient or the offset list of the time series data in the memory is full; and
in response to the determining that the time series data cached in the memory needs to be written to the disk:
when the sum of number of the records is less than a pre-set number N, writing, by the processor, the to-be-written-to-disk time series data to the LAST file of the disk, wherein the pre-set number N is a minimum number of records; and
when the sum of number of the records is greater than or equal to the pre-set number N, merging, by the processor, the to-be-written-to-disk time series data and the time series data in the LAST file of the disk to obtain a merged time series data, and writing the merged time series data to a new or existing DATA file for permanently saving data of the disk in a column-based storage manner.

2. The method according to claim 1, wherein the LAST file has a storage space for storing records of the time series data.

3. The method according to claim 2, wherein writing the to-be-written-to-disk time series data to the LAST file of the disk comprises: writing the to-be-written-to-disk time series data after the time series data in the storage space of the LAST file.

4. The method according to claim 1, wherein the LAST file contains an offset list of the time series data, and the offset list contains N offset records for indicating offsets of the records of the time series data in the LAST file.

5. The method according to claim 4, wherein after writing the to-be-written-to-disk time series data to the LAST file of the disk, writing the offsets of corresponding records of the to-be-written-to-disk time series data sequentially to the offset list of the time series data.

6. The method according to claim 1, wherein the LAST file contains the time series data already written thereto.

7. The method according to claim 6, wherein writing the to-be-written-to-disk time series data to the LAST file of the disk comprises: merging the to-be-written-to-disk time series data and the time series data in the LAST file of the disk to obtain a merged time series data; creating a new LAST file for storing the merged time series data; writing the merged time series data to the new LAST file, and then deleting original LAST file.

8. The method according to claim 1, wherein merging the to-be-written-to-disk time series data and the time series data in the LAST file of the disk to obtain a merged time series data, and writing the merged time series data to a DATA file for permanently saving data of the disk in a column-based storage manner comprises: reading the time series data from the LAST file; merging the to-be-written-to-disk time series data and the time series data read from the LAST file to obtain the merged time series data; and writing the merged time series data to the DATA file of the disk in the column-based storage manner.

9. The method of claim 1, wherein the LAST file and the DATA file are both files in the disk for storing the time series data.

\* \* \* \* \*